(12) United States Patent
Pope et al.

(10) Patent No.: US 7,762,877 B2
(45) Date of Patent: Jul. 27, 2010

(54) TAILING RE-THRESHER RASP BAR AND ROTOR HOUSING

(75) Inventors: Glenn Pope, Viola, IL (US); Aaron Bruns, Davenport, IA (US); Edward L. Farwell, Hampton, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/130,927

(22) Filed: May 30, 2008

(65) Prior Publication Data

US 2009/0143120 A1 Jun. 4, 2009

Related U.S. Application Data

(60) Provisional application No. 61/005,005, filed on Nov. 29, 2007.

(51) Int. Cl.
  *A01F 12/52* (2006.01)
(52) U.S. Cl. ........................................................ 460/13
(58) Field of Classification Search ................... 460/13, 460/71, 72; 241/294, 221, 242
  See application file for complete search history.

(56) References Cited

U.S. PATENT DOCUMENTS

| | | | | |
|---|---|---|---|---|
| 2,173,605 | A | * | 9/1939 | Edwards, Jr. ................. 460/75 |
| 3,011,497 | A | * | 12/1961 | Larsson et al. ................ 460/73 |
| 3,038,476 | A | * | 6/1962 | Andersen ...................... 460/76 |
| 3,662,763 | A | * | 5/1972 | Denison et al. ............... 460/75 |
| 3,871,384 | A | * | 3/1975 | Depauw et al. ............. 460/109 |
| 3,976,084 | A | * | 8/1976 | Weber .......................... 460/14 |
| 4,062,366 | A | * | 12/1977 | De Coene ..................... 460/14 |
| 4,303,078 | A | * | 12/1981 | Stokland ...................... 460/76 |
| 4,310,004 | A | | 1/1982 | De Busscher et al. |
| 4,348,855 | A | | 9/1982 | DePauw et al. |
| 4,378,024 | A | * | 3/1983 | De Busscher et al. ......... 460/73 |
| 4,444,208 | A | * | 4/1984 | Raineri ........................ 460/74 |
| 4,458,697 | A | * | 7/1984 | James .......................... 460/74 |
| 4,461,306 | A | * | 7/1984 | De Busscher ............... 460/104 |
| 4,466,447 | A | | 8/1984 | Hoefer et al. |
| 4,470,420 | A | | 9/1984 | Hanaway |
| 4,498,483 | A | * | 2/1985 | Dammann ................... 460/69 |

(Continued)

FOREIGN PATENT DOCUMENTS

GB    1311710 A    3/1973

(Continued)

OTHER PUBLICATIONS

European Search Report dated Mar. 9, 2009, (7 pages).

*Primary Examiner*—Árpaád Fábián-Kovács
(74) *Attorney, Agent, or Firm*—Erickson Law Group, PC

(57) ABSTRACT

A re-threshing apparatus and method for a combine harvester includes a rotor having threshing elements mounted thereon extending substantially radially. The rotor is rotationally mounted within a housing at least partially surrounding the rotor. The housing includes an inlet and an outlet. The housing has a wall portion with rasp bars extending toward the rotor. The wall portion is substantially solid, i.e., material re-threshed by the rasp bars remains within the housing until it moves through the housing outlet. The rotor and the housing are configured for tailings to be flung tangentially into the housing against the rasp bars and re-threshed between the threshing elements and the rasp bars within the housing.

28 Claims, 10 Drawing Sheets

U.S. PATENT DOCUMENTS

| | | | |
|---|---|---|---|
| 4,531,528 A | 7/1985 | Peters et al. | |
| 4,606,355 A * | 8/1986 | Dammann | 460/69 |
| 4,875,891 A * | 10/1989 | Turner et al. | 460/110 |
| 4,964,838 A | 10/1990 | Cromheecke et al. | |
| 5,112,279 A | 5/1992 | Jensen et al. | |
| 5,344,367 A | 9/1994 | Gerber | |
| 5,376,047 A | 12/1994 | Harden et al. | |
| 5,445,563 A | 8/1995 | Stickler et al. | |
| 5,497,605 A | 3/1996 | Underwood et al. | |
| 5,498,206 A | 3/1996 | Underwood et al. | |
| 5,688,170 A | 11/1997 | Pfeiffer et al. | |
| 6,036,598 A | 3/2000 | Harden et al. | |
| 6,442,916 B1 * | 9/2002 | Pope | 56/10.2 R |
| 6,468,152 B2 | 10/2002 | Moriarty | |
| 6,672,957 B2 | 1/2004 | Voss et al. | |
| 6,758,745 B2 * | 7/2004 | Van Der Haegen et al. | 460/109 |
| 6,884,161 B2 | 4/2005 | Moriarty | |
| 6,958,012 B2 * | 10/2005 | Duquesne et al. | 460/76 |
| 7,025,673 B2 | 4/2006 | Schmidt et al. | |
| 7,070,498 B2 | 7/2006 | Grywacheski et al. | |
| 2002/0128054 A1 | 9/2002 | Lauer | |
| 2003/0216159 A1 * | 11/2003 | Van Der Haegen et al. | 460/107 |
| 2004/0137973 A1 | 7/2004 | Schmidt | |
| 2005/0009591 A1 * | 1/2005 | Duquesne et al. | 460/107 |
| 2005/0164755 A1 | 7/2005 | Nelson et al. | |
| 2006/0128451 A1 * | 6/2006 | Ricketts et al. | 460/59 |
| 2007/0026913 A1 * | 2/2007 | Kuchar | 460/112 |

FOREIGN PATENT DOCUMENTS

| | | |
|---|---|---|
| GB | 1548383 A | 7/1979 |
| GB | 2051542 A | 1/1981 |

* cited by examiner

TAILING RE-THRESHER RASP BAR AND ROTOR HOUSING

This application claims the benefit of U.S. provisional patent application Ser. No. 61/005,005 filed on Nov. 29, 2007.

FIELD OF THE INVENTION

This invention relates in general to grain harvesting combines, and in particular to a system for re-threshing tailings from the crop cleaning section of a combine.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

A grain harvesting combine has a header which cuts the crop and feeds it upward into a threshing and separating rotor within a housing having a perforated wall. The rotor rotates within the housing, passing grain within clearances between the rotor and perforated housing to thresh grain from the crop.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section. Examples are shown in U.S. Pat. Nos. 5,445,563; 5,688,170 and 7,070,498, herein incorporated by reference.

The threshed grain falls onto a grain pan, and from the grain pan onto a set of upper and lower sieves. The sieves are oscillated, causing clean grain to fall through for collection. A blower blows air upward through the sieves, discharging chaff to the rear. Straw from the threshing chamber proceeds through a straw beater and out the rear of the combine.

The clean grain is collected and conveyed to the grain tank. Incompletely threshed grain will not proceed through the fingers of the sieves, yet is too heavy to be blown out the rear along with the chaff. This grain, called "tailings" or "returns" is often returned to the threshing and separating rotor for re-threshing. However, when tailings are returned to the rotor for re-threshing, under some grain conditions, called "white caps", tailings will pass through the rotor yet again without the grain separating from the chaff.

Some prior art grain harvesting combines have dedicated re-threshing rotors for receiving tailings from the sieves, re-threshing the tailings, and passing the tailings back through the primary rotor for re-threshing.

U.S. Pat. No. 5,498,206 discloses a grain combine that includes a primary threshing rotor which rotates to thresh grain from crop, a sieve section for separating grain from chaff, a clean grain conveyor, a clean grain storage tank, and a re-threshing section for re-threshing tailings. The re-threshing section has a re-threshing rotor which receives the tailings from the sieve section. The re-threshing rotor extends completely across an end of the sieve section for rotating about an axis which extends in parallel to the end of the sieve section. The re-threshing rotor includes rasp bars which extend along the end of the sieve section for receiving the tailings and pressing the tailings against a re-threshing pan. Blowers are provided for removing loose chaff from the tailings in the re-threshing section. The re-threshed tailings, including clean grain separated from the tailings by re-threshing, are returned to the primary rotor for re-threshing.

The present inventors have recognized that some prior methods are limited in their ability to prevent grain damage in damage-sensitive crops. The present inventors have recognized that a need exists for a re-threshing system, method and apparatus that provided satisfactory yield, throughput, and minimal crop damage.

SUMMARY OF THE INVENTION

The invention provides a re-threshing apparatus for a combine harvester. The re-threshing apparatus includes a rotor having threshing elements mounted thereon extending substantially radially. The rotor is rotationally mounted within a housing at least partially surrounding the rotor. The housing includes an inlet and an outlet. The housing has a wall portion with rasp bars extending toward the rotor. The wall portion is substantially solid, i.e., material re-threshed by the rasp bars remains within the housing until it moves through the housing outlet. The rotor and the housing are configured for tailings to be re-threshed between the threshing elements and the rasp bars within the housing.

Depending on the crop the threshing elements of the rotor of the re-threshing apparatus can be rasp bars, or swept back bars, or serrated bars.

The wall portion is pivotally adjustable in a direction toward and away from the rotor to adjust the clearance between the rasp bars and the threshing elements.

Preferably, the rotor has a horizontal axis and an inlet arranged above the axis and an outlet below the axis and wherein the inlet is arranged to receive tailings flung through the inlet in a tangential direction with respect to the rotor.

The invention provides a re-threshing system and method that includes the above described re-threshing apparatus, a vertical elevator for transporting tailings from a cleaning section of the combine, a deflector for selectively directing tailings into the re-threshing apparatus or for directing tailings to bypass the re-threshing apparatus, and a delivery apparatus for distributing the re-threshed tailings within the cleaning section.

The invention provides a method of re-threshing tailings in a combine harvester. The housing has a stationary substantially solid wall portion with rasp bars extending therefrom. The housing has an inlet and an outlet. A rotor is located within the housing and has threshing elements extending therefrom. Tailings are thrown through the inlet into the housing. The rotor within the housing re-threshes the tailings between the threshing elements and the rasp bars. The step of throwing can be further defined by arranging the inlet to face the wall portion, and throwing tailings tangentially into the housing to impact the wall portion. The method can comprise the further step of adjusting clearance between the threshing elements and the rasp bars by selectively moving the wall portion.

Although the invention is illustrated as being used on a rotary combine, the present invention can be used on other combine types including conventional straw walker combines and hybrid combines having transverse threshing cylinders and rotary separators.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

Figure 1:
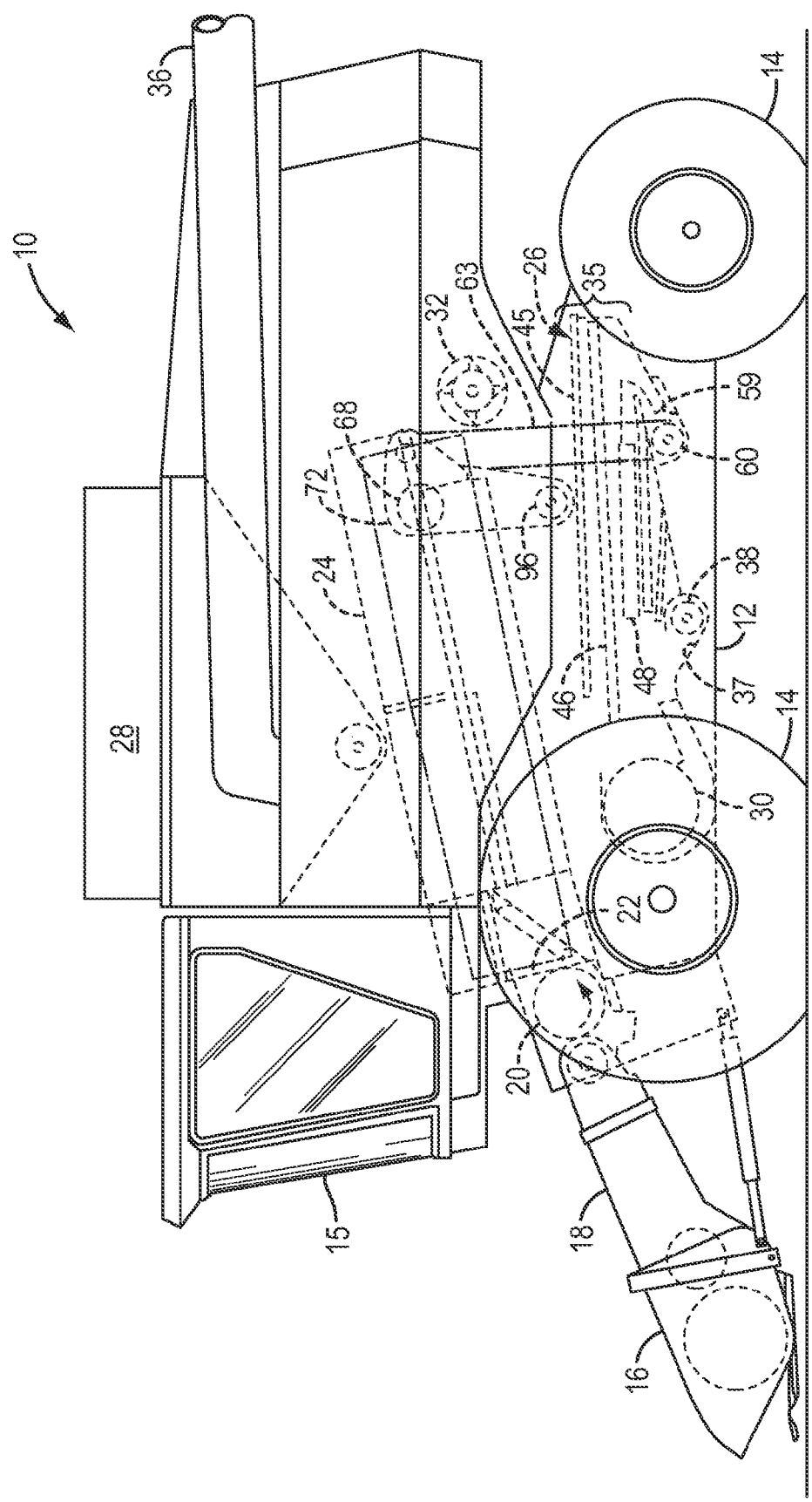
FIG. 1 is a diagrammatic side view of an agricultural combine the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an agricultural combine 10 comprising a supporting structure 12 having ground engaging wheels 14 extending from the supporting structure. The operation of the combine is controlled from an operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in a grain tank 28. The clean grain in the tank 28 can be unloaded into a grain cart or truck by unloading auger 36. Threshed and separated straw is discharged from the axial crop processing unit 24 through outlet 32 to discharge beater 34. The discharge beater 34 in turn propels the straw out the rear of the combine.

Cleaned grain from the cleaning system 26 is collected in a clean grain pan 37 and fed by means of a grain auger 38 to an elevator (not shown) that conveys the grain into the grain tank 28.

Figure 2:
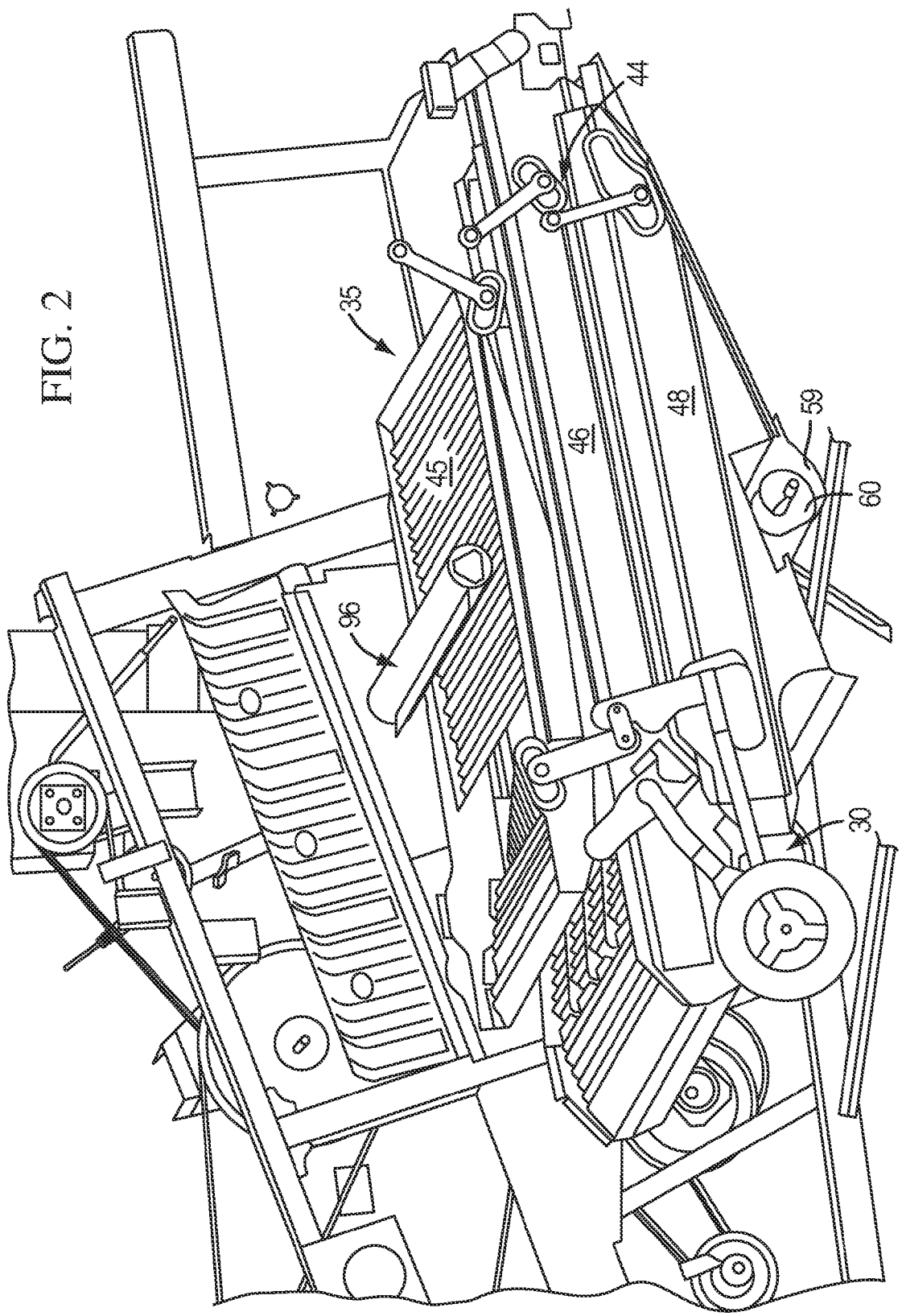
FIG. 2 is a near side, fragmentary, perspective view of a crop cleaning system taken from the combine shown in FIG. 1.

As illustrated in FIG. 2, the cleaning system 26 comprises a cleaning shoe 35 and a cleaning fan 30. The cleaning shoe 35 comprises a frame 44 holding a return pan 45, a chaffer sieve 46 and a lower, secondary sieve 48.

The illustrated cleaning shoe 35 is a reciprocating shoe wherein the return pan 45, the chaffer sieve 46, and the secondary sieve 48 are reciprocated, oscillated or shaken to move crop material and to enhance separation through the sieves.

The chaffer 46 and the lower, secondary sieve 48 are arranged one above the other. The sieves 46, 48 oscillate or otherwise move during the operation of the cleaning shoe 35 in such a way that the harvested material separated by the threshing and separating device 24 is received on the side of the sieves 46, 48 which faces the threshing and separating device 24 and is additionally conveyed opposite the driving direction of the combine 10. In order to achieve an optimal cleaning effect of the cleaning shoe 35, the rotational speed of the blower and the width of the openings in the sieves 46, 48 can be varied.

Figure 5:
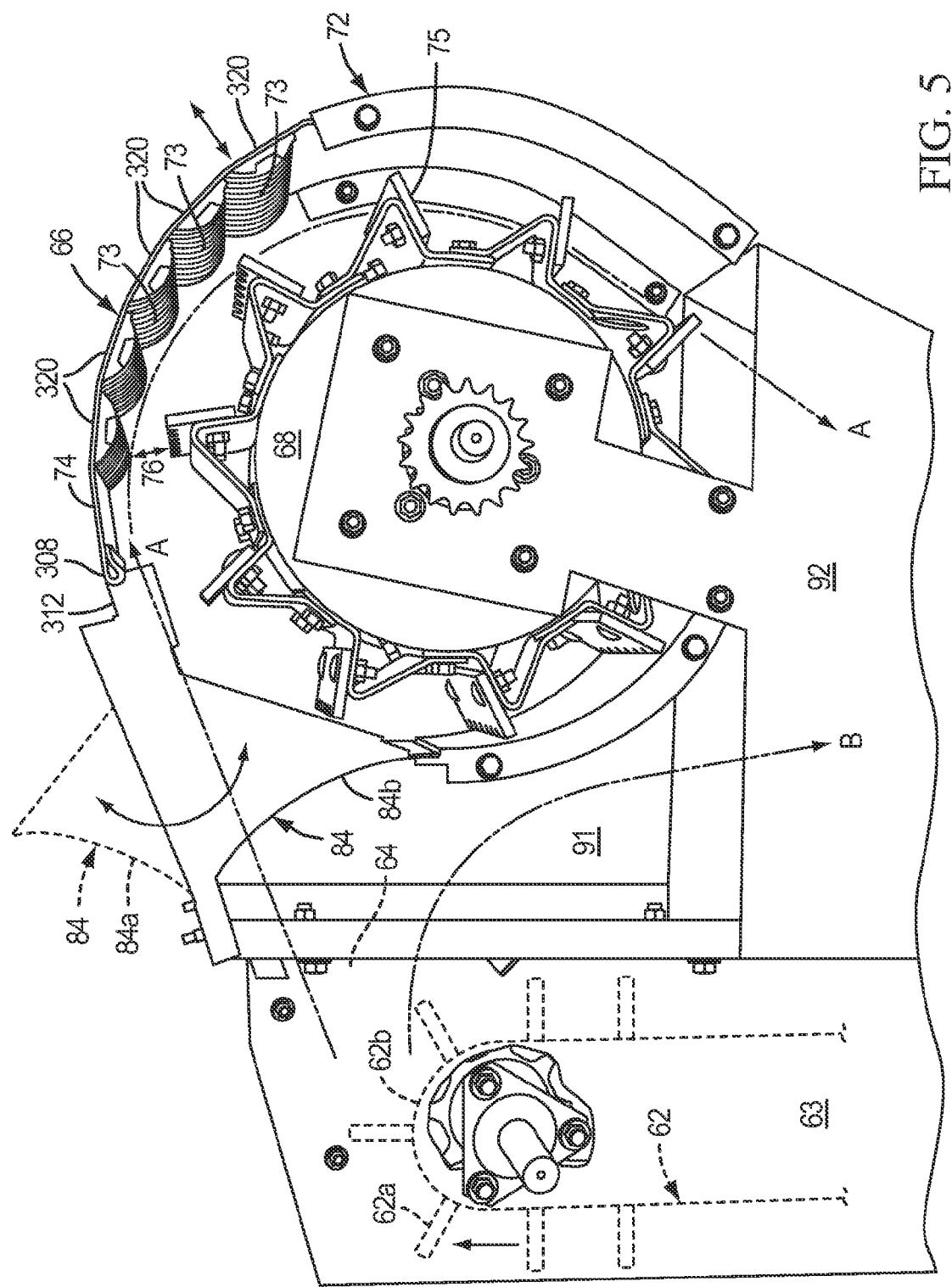
FIG. 5 is a far side, enlarged, fragmentary perspective view of re-threshing rotor and housing taken from FIG. 3, with near side and far side covers removed to view the rotor.

Combine cleaning systems are disclosed in U.S. Pat. Nos. 4,531,528 and 6,672,957; and U.S. Pub. App. Nos. 2002/0128054 and 2005/0164755, all herein incorporated by reference FIGS. 2-5 illustrate non-threshed crop portions or tailings are collected in a tailings pan 59 and moved by a tailings auger 60 to a circulating chain elevator 62 within a housing 63 which elevates the tailings to a discharge opening 64 by way of paddles 62a attached to an endless chain 62b (FIG. 5). Such an elevator is known and is disclosed for example as elevator 54 in U.S. Pat. No. 5,497,605, herein incorporated by reference. As individual paddles 62a carried by the circulating chain turn over at a top of their vertical travel, the paddles 62a propel or fling the tailings into a re-threshing apparatus 66 that comprises a re-threshing rotor 68 driven in rotation within a re-threshing housing 72.

Re-threshing rotor 68 rotates within re-threshing housing 72. The housing 72 includes rasp bars 73 on an adjustable wall portion 74. There are no perforations in the wall portion 74. The rotor includes beating or threshing elements such as bars 75 that pass by the rasp bars 73. Each rasp bar 73 has a finned area formed by a plurality of elements extending upward from a base portion. Rasp bars and other threshing elements are described in U.S. Pat. Nos. 4,964,838; 4,348,855; 6,036,598; 7,070,498; and 5,376,047, all herein incorporated by reference.

Gap 76 between the bars 75 and the rasp bars 73 can be selectively adjusted by moving wall 74 either towards or away from rotor 68. Selecting gap 76 controls the yield and throughput for re-threshing a particular crop. Re-threshing yield is increased by decreasing gap 76 so that more clean grain is separated from tailings. However, decreasing gap 76 to increase yield decreases throughput, since clearances are reduced. Thus, gap 76 should be set for particular crops to counterbalance throughput verses yield for re-threshing tailings.

A deflector 84 is provided within the housing 72 which is effective to cause tailings to bypass the re-threshing rotor 68 and re-threshing housing 72. The deflector 84 is shown in a first, standby position marked 84a (shown dashed) and a second, deployed position marked 84b. With the deflector 84 in the position marked 84a, re-threshing crop flow is thrown by the paddles of elevator 62 through the discharge opening 64 in a tangential direction indicated by arrow marked "A"

into the re-threshing housing 72. With the deflector 84 in position marked 84b, bypass crop flow is thrown downward through a vertical bypass path 91 and into a discharge chute 92 in the direction indicated by arrow marked "B."

The rotor 68 is driven on one axial end by a pulley or sprocket 93 driven by a belt or chain 93a driven by the equipment drive power system of the combine on a near side of the housing 72.

Figure 3:
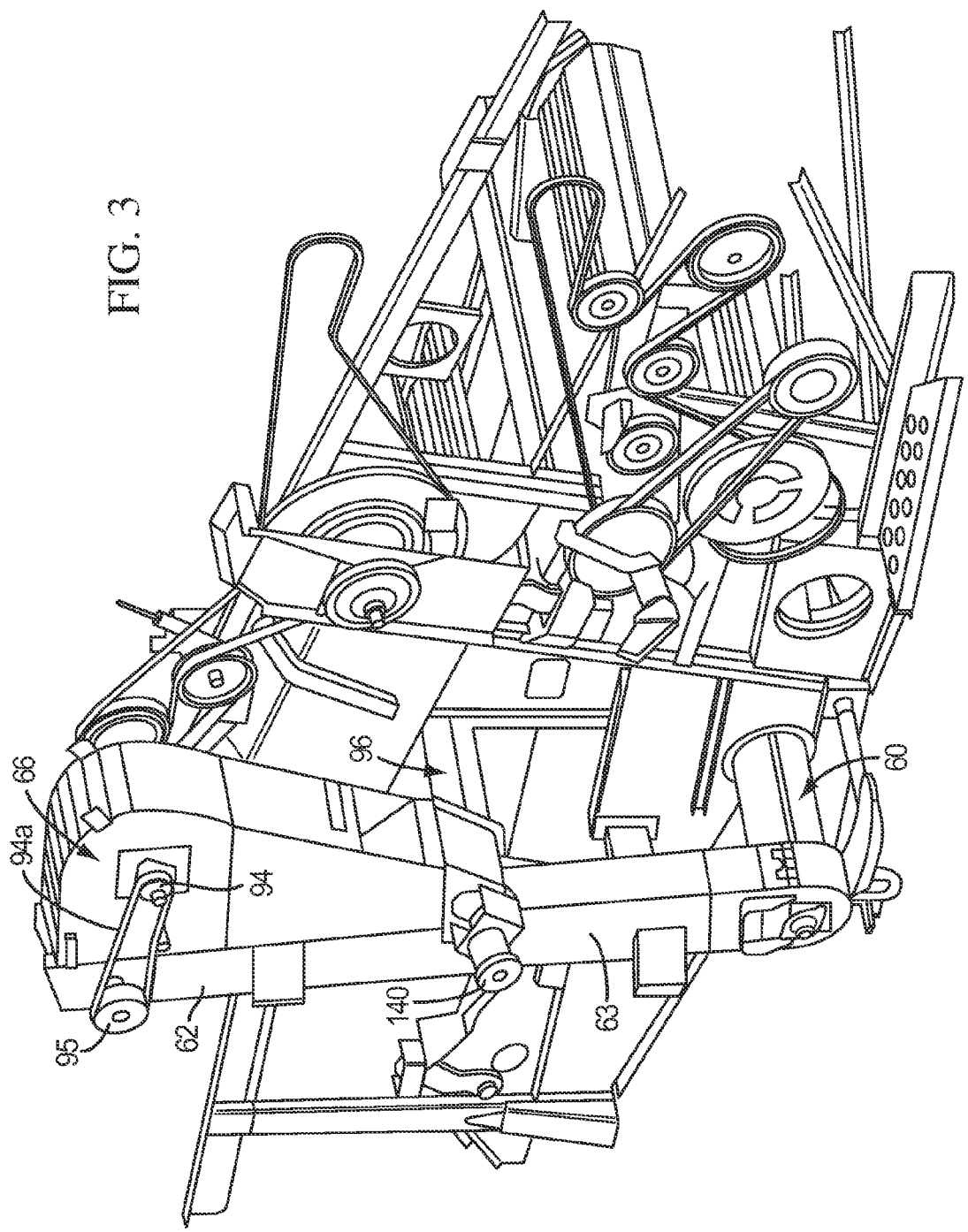
FIG. 3 is a far side, fragmentary, perspective view of the crop cleaning system of FIG. 2.
Figure 4:
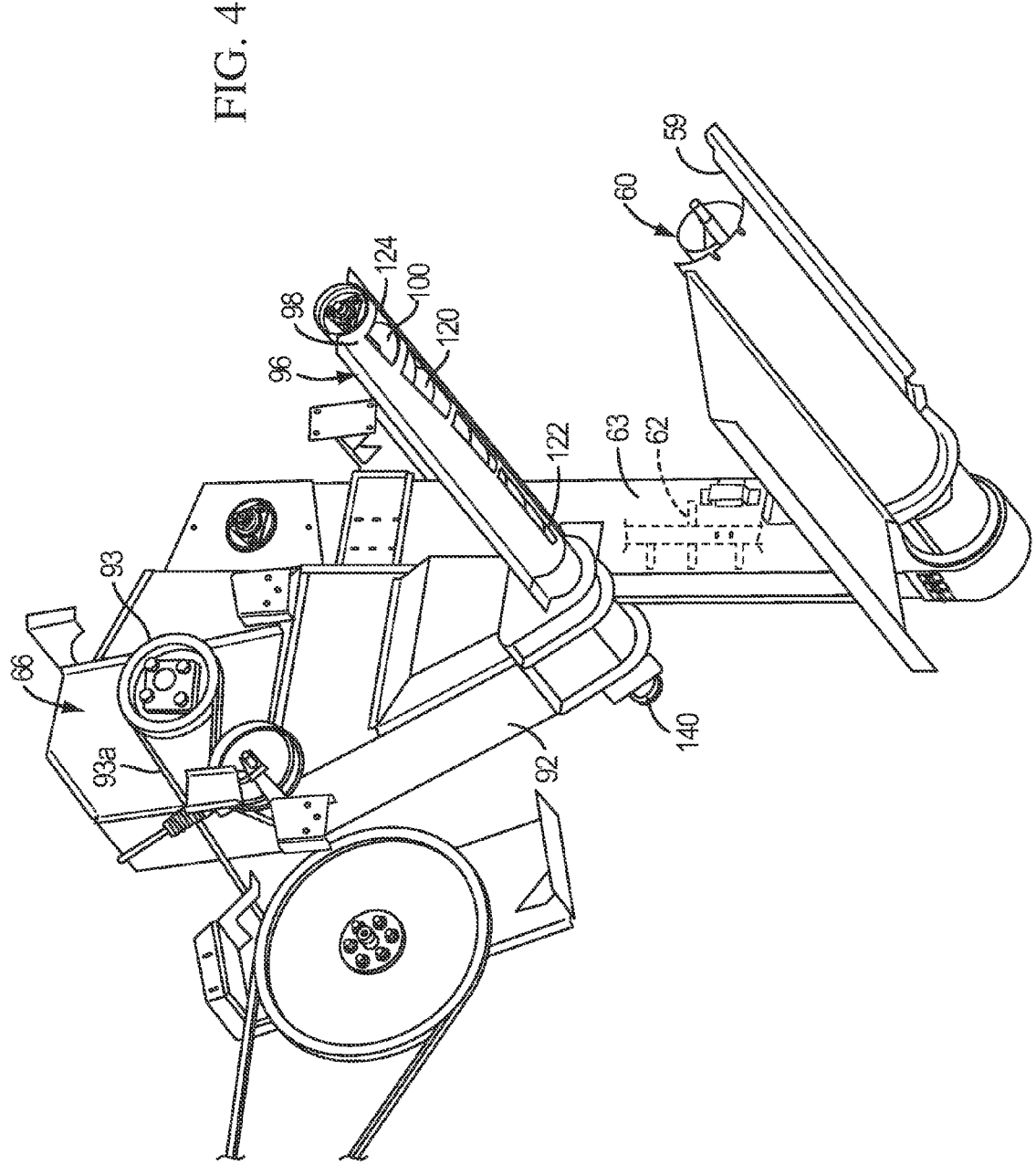
FIG. 4 is a near side, fragmentary, perspective view of a tailings re-threshing system taken from FIG. 2.

The other axial end of the rotor 68 drives a pulley or sprocket 94 that circulates a belt or chain 94a, that drives a pulley or sprocket 95 that drives the circulating chain 62b of the elevator 62 (FIG. 3).

Re-threshing crop flow "A" and/or bypass crop flow "B" exits the housing 72 downward through the discharge chute 92 to an auger 96. The auger 96 includes a tubular auger housing 98 and an auger screw 100.

The tubular auger housing 98 is arranged transversely across the cleaning system 26, particularly over the return pan 45. The auger housing includes a tapered slot formation 120 that has a far side small width 122 increasing to a near side maximum width 124. In this way, the tailings conveyed by the auger screw 100 from the chute 92 will be evenly distributed from out of the slot formation 120 transversely across the return pan.

The auger screw 100 is driven in rotation by a sprocket or pulley 140 located on its far side end that is driven by a belt or chain (not shown) from the equipment drive power system of the combine.

Figure 6:
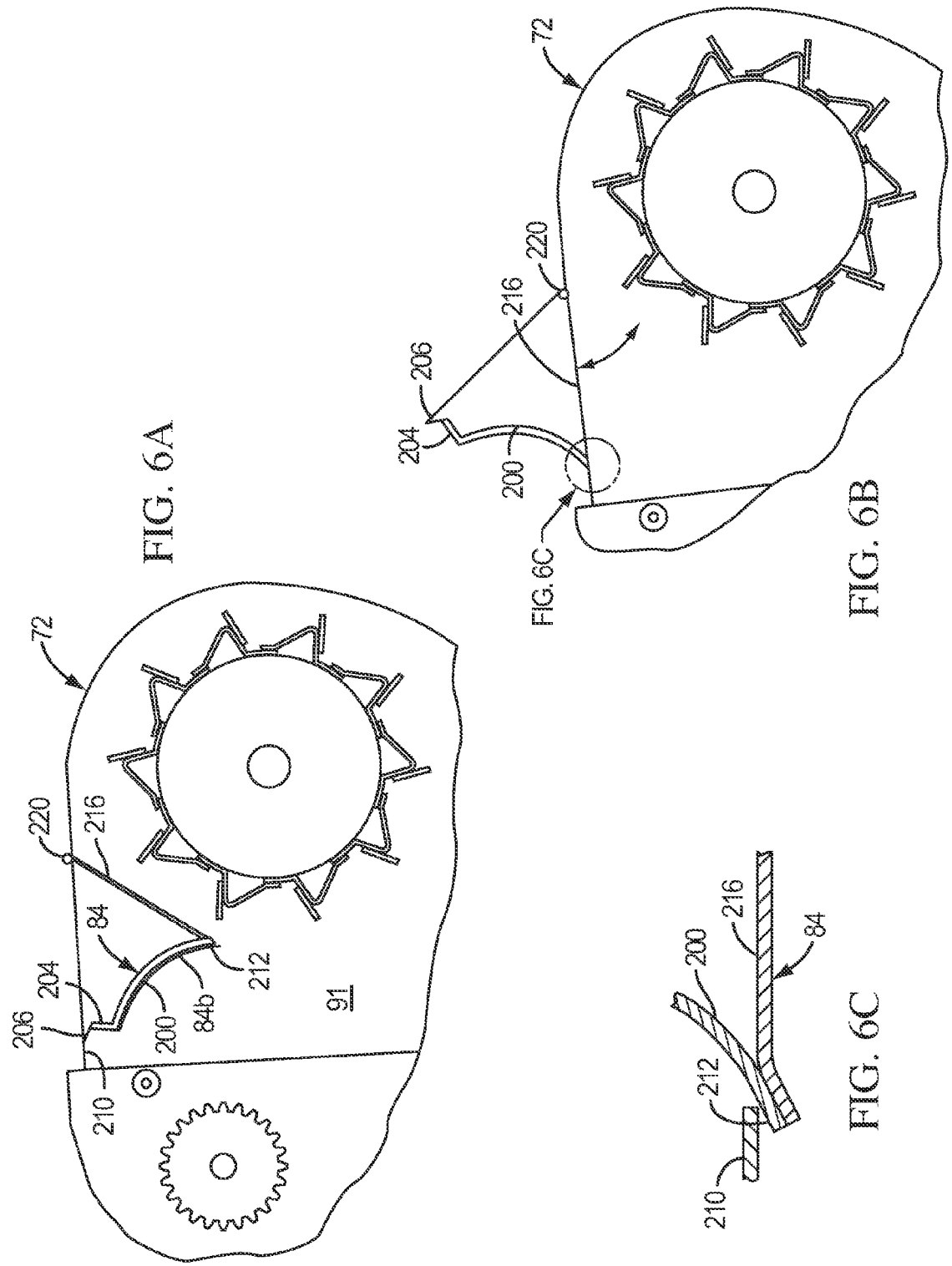
FIG. 6A is a diagrammatic cross-sectional view of a deflector in the deployed position.
FIG. 6B is a diagrammatic cross-sectional view of the deflector of FIG. 6A rotated to a standby position.
FIG. 6C is an enlarged sectional taken from FIG. 6B.
Figure 7:
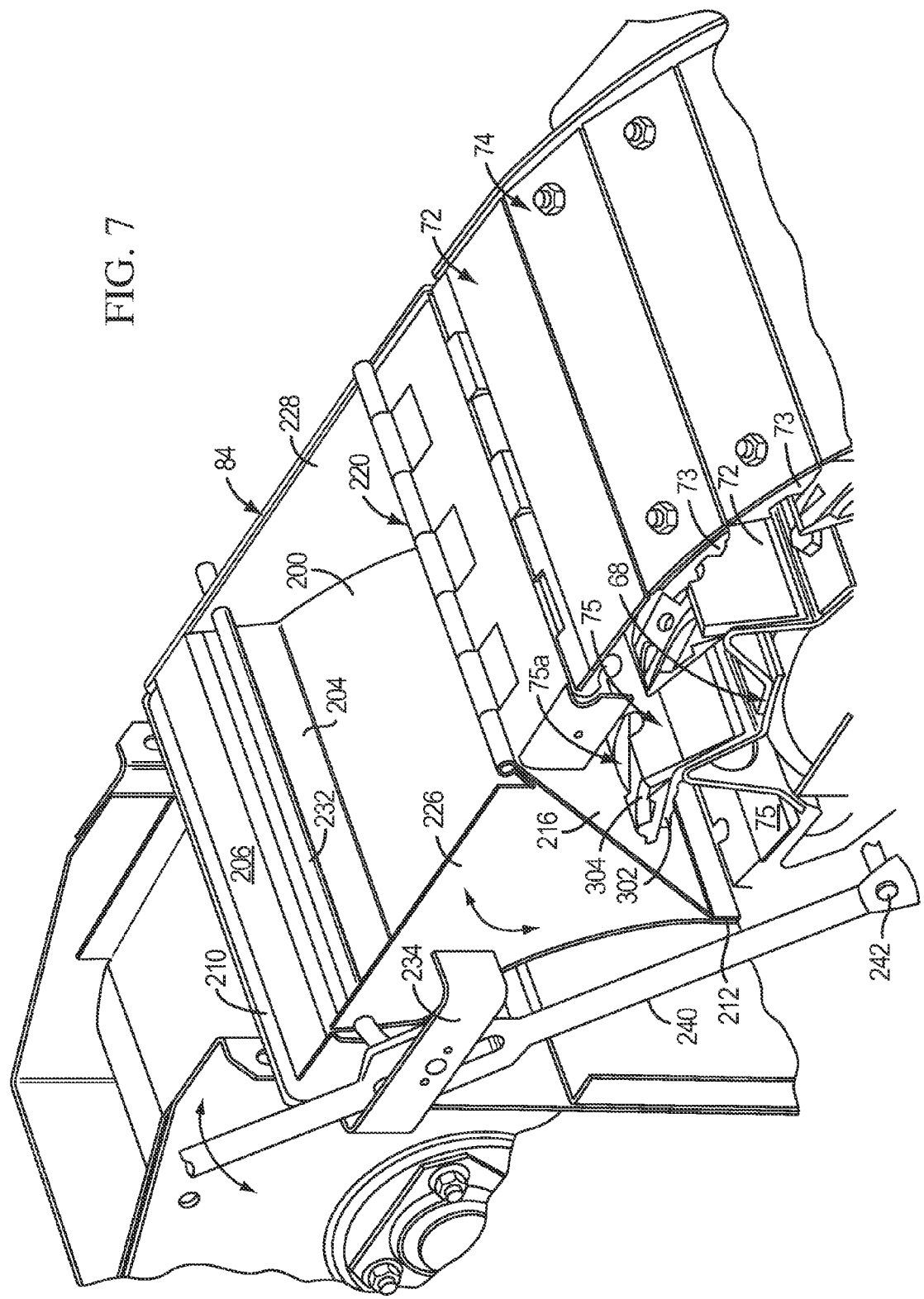
FIG. 7 is an enlarged fragmentary view of the deflector shown in FIG. 6A in the deployed position.

FIGS. 6A-7 illustrate the deflector 84 in more detail.

As shown in FIG. 6A, the deflector 84 is in the deployed position 84b. The deflector 84 includes an arcuate deflecting plate 200 that smoothly deflects tailings thrown in a horizontal direction to a downward direction into the bypass path 91. The plate 200 is formed with a vertical support plate 204 having a horizontal lip 206. The lip 206 rests on, and substantially seals against, a stationary housing plate 210 of the housing 72. The plate 200 also includes an opposite end lip 212. An inclined brace plate 216 is connected at one end to the plate 200 and at an opposite end to a hinge assembly 220 that is secured to the housing 72. The hinge assembly 220 allows the deflector 84 to pivot between the two positions shown in FIGS. 6A and 6B. As shown in FIG. 7, the plates 200, 216 are connected together by sideplates 226, 228 to create a rigid assembly. A lift bar 232 penetrates through the sideplates 226, 228 and is connected atone end to a bracket 234. The deflector 84 can be pivoted by force exerted on the bracket 234. In this regard, a lever 240 (shown schematically only) can be pivotally mounted to the housing 72 and pivoted about a pivot point 242 with respect to the housing 72 to pivot the deflector 84.

When the deflector 84 is pivoted to the standby position of FIG. 6B the lip 212 substantially seals against a bottom of the wall 210 as shown in FIG. 6C. The lever 240 can be fixed to fix the deflector at a desired pivotal position corresponding to either of the positions shown in FIGS. 6A and 6B by bolting the lever to the housing at the desired position, or by providing some other releasable fixation means.

The plates 200, 204, 206, 212, 216, 226, 228 are typically metal plates that can be formed and assembled using fasteners, bending, rivets, welding or other methods known to those skilled in the art.

Figure 8:
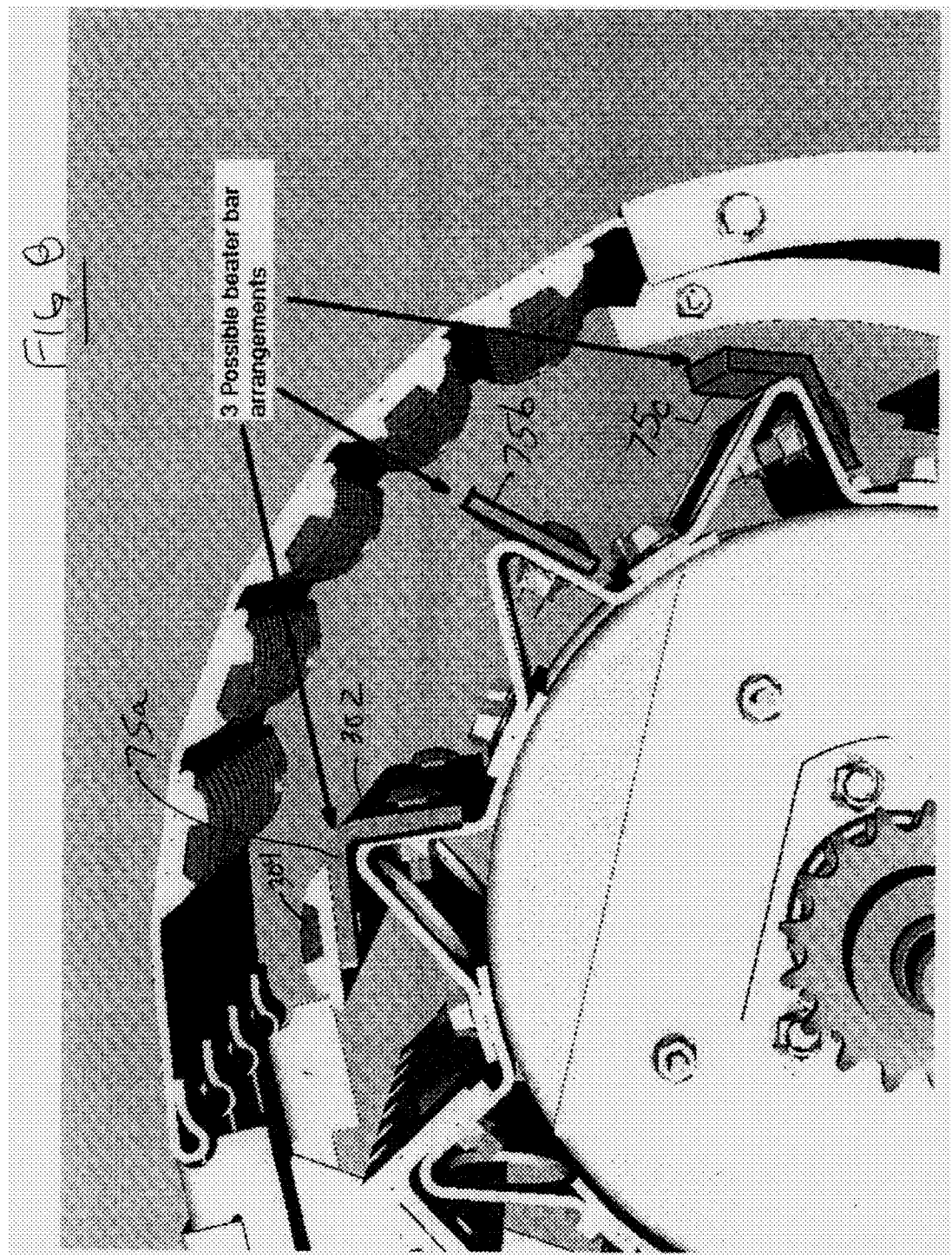
FIG. 8 is a far side, enlarged, fragmentary perspective view of re-threshing rotor and housing taken from FIG. 3, with near side and far side covers removed to view the rotor, and showing three different types of rotor threshing elements.

FIG. 8 illustrates three possible bars 75 that can be used on the rotor 68. Typically, only one type would be used on the rotor 68 but three different types are shown for illustration. However, it is also encompassed by the present invention to use more than one type of bar 75 on a single rotor 68.

A rasp bar 75a is illustrated having a mounting portion 302 that holds rasp elements 304. The rasp elements 304 are structured similarly to the rasp bar 73. The each rasp element has a finned area formed by a plurality of elements extending upward from a base portion.

This rasp bar 75a would be useful for rasp-on-rasp type threshing for difficult to thresh crops.

A serrated flat bar or comb bar 75b is illustrated and is particularly suitable for wet material movement.

A sweptback bar 75c is illustrated and is suitable for satisfactory material movement and threshing. It is suitable as a general-purpose bar.

Figure 9:
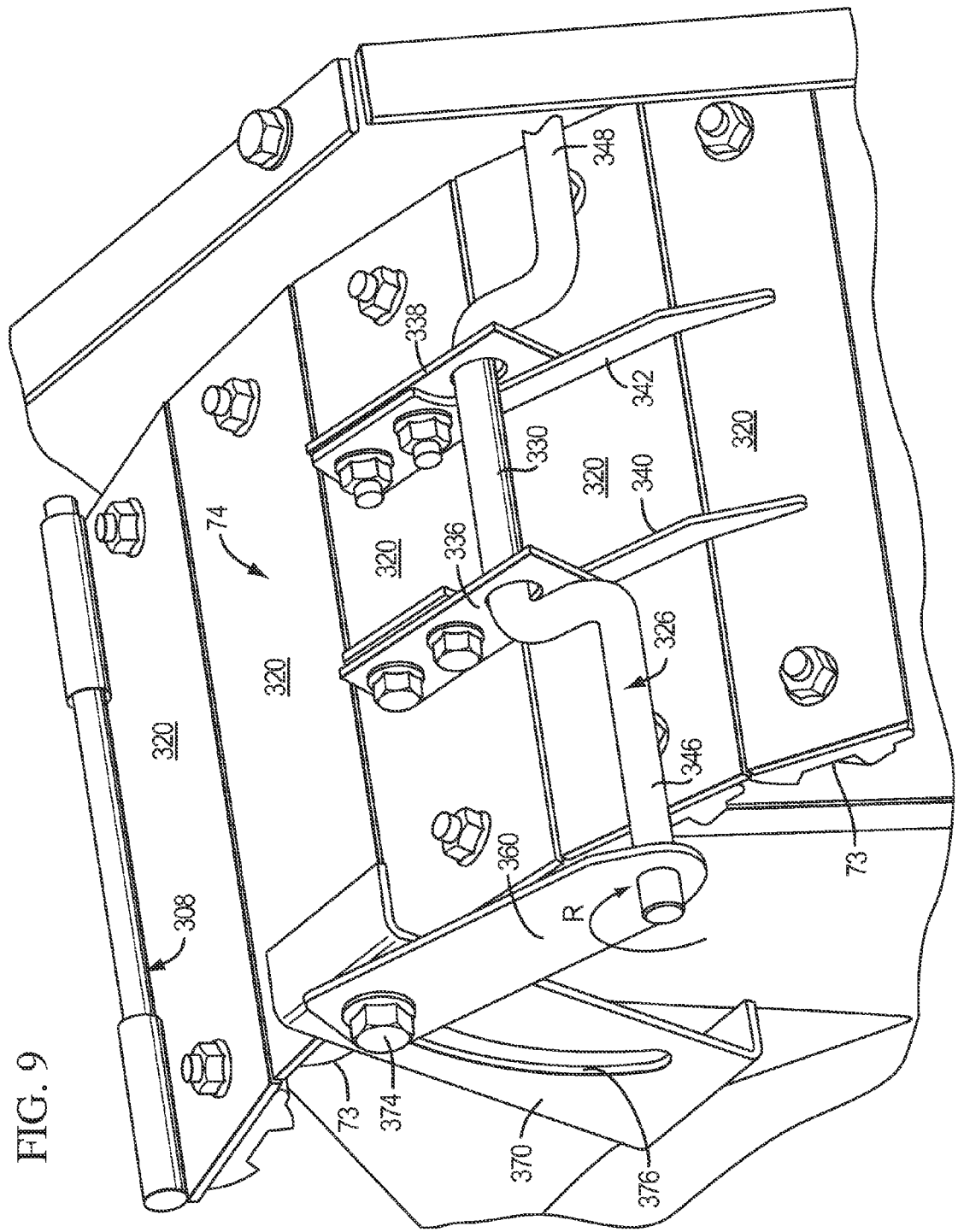
FIG. 9 is a far side, enlarged, fragmentary perspective view of re-threshing rotor and housing taken from FIG. 3, showing a top side of the housing, with the wall portion in an elevated position.
Figure 10:
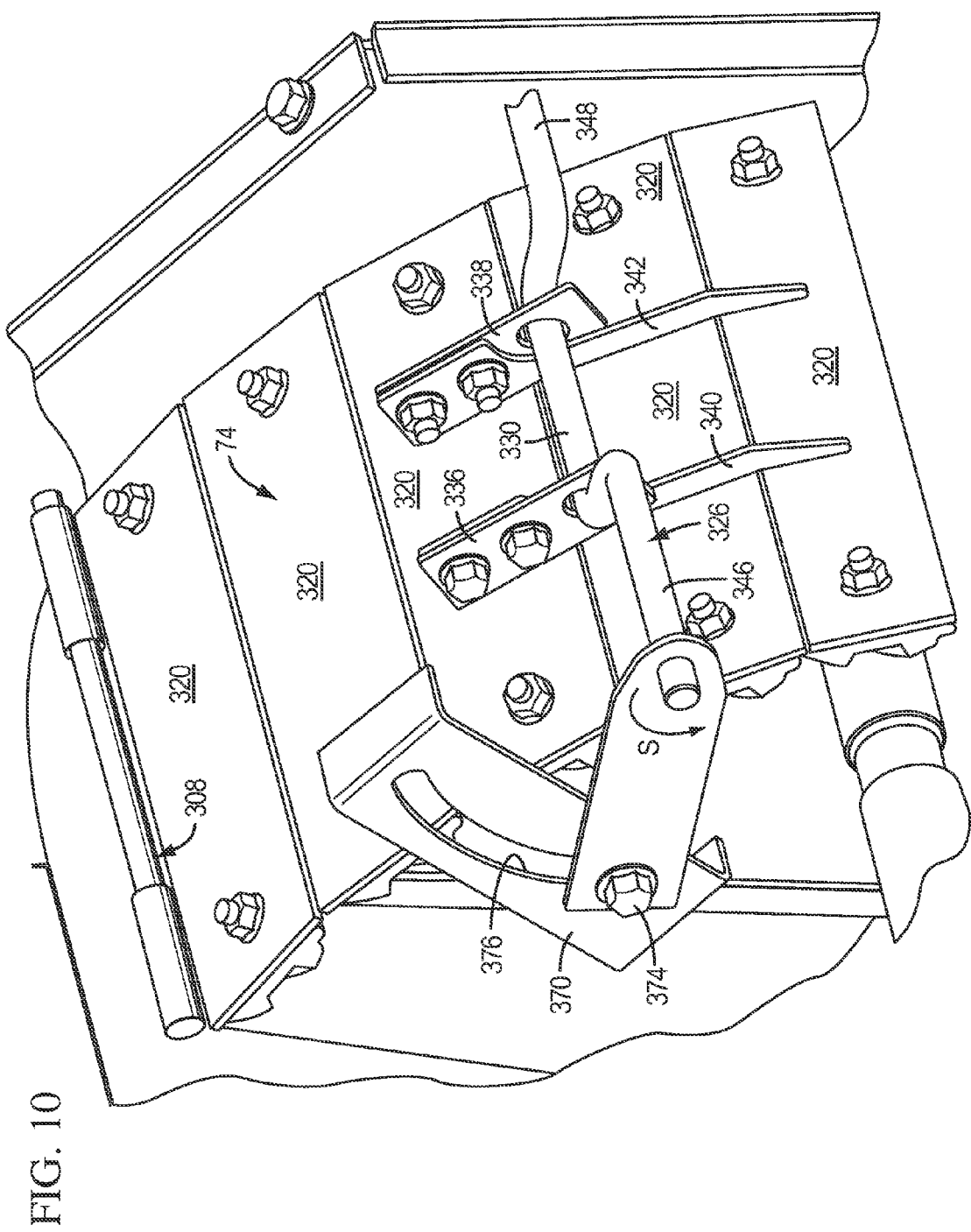
FIG. 10 is a far side, enlarged, fragmentary perspective view of re-threshing rotor and housing taken from FIG. 3, showing a top side of the housing, with the wall portion in a lowered position.

As illustrated in FIGS. 5, 9 and 10, the wall portion 74 is hinged by a hinge assembly 308 to a stationary portion 312 of the housing 72 to be pivotable with respect to the stationary portion 312. The wall portion 74 comprises a plurality of flat plates 320 connected together to approximate a curved surface. Each flat plate 320 mounts a rasp bar 73 on an underside thereof.

As shown in FIGS. 9 and 10, the wall portion 74 is supported by the hinge assembly 308 at one end and by a crank bar 326 near an opposite end. The crank bar 326 includes an offset portion 330 that penetrates through two brackets 336, 338 that are fastened to reinforcing ribs 340, 342 that connect the last three flat plates 320.

End portions 346, 348 of the crank bar 326 are each rotationally fixed to a lever 360, one on each side of the housing 72 (only one being visible in the figures the other one being mirror image identical in structure and operation). The levers 360 are each fixed to a stationary bracket 370 (only one being visible in the figures the other one being mirror image identical in structure and operation) by a bolt 374 and a corresponding nut (not visible), the bolt being slidable through a slot 376 in the stationary bracket 370 when the nut is loosened.

FIG. 9 shows the wall portion 74 pivoted away from the rotor 68 a maximum amount. The levers 360 (the opposite side lever not visible) have been pivoted together clockwise in the rotary direction R and the offset portion 330 of the crank bar 326 has been raised by rotation of the crank bar 326, to pivot the wall portion 74 up via the brackets 336, 338 and the ribs 340, 342. After pivoting the wall portion 74 the nut is tightened on the bolt 374 to fix the wall portion 74 in position.

FIG. 10 shows the wall portion 74 pivoted toward from the rotor 68 a maximum amount. The levers 360 (an opposite side lever not visible) have been pivoted together counterclockwise in the rotary direction S and the offset portion 330 of the crank bar 326 has been lowered by rotation of the crank bar 326, to pivot the wall portion 74 down via the brackets 336, 338 and the ribs 340, 342. After pivoting the wall portion 74 the nut is tightened on the bolt 374 to fix the wall portion 74 in position.

According to the invention there are no holes in the wall portion 74 for grain to pass through. The grain, once rubbed against the rasp bars 73 falls back into the housing 72 due to gravity and momentum, particularly because of the positioning of the rasp bars at an elevated position regarding the outlet of the housing 72. The bars 75 move tailings against the rasp bar 73 and re-threshing is accomplished by both the rubbing action between the bars 75 and the rasp bars 73 and a throwing action of the bars 75 throwing material against the uneven surface of the rasp bars 73, with the assistance of gravity as the tailings fall from the rasp bars 73.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a combine having a harvesting platform, a threshing section and a cleaning section, a re-threshing mechanism having a rotor, the improvement comprising:
   threshing elements mounted on said rotor;
   said elements extending at least partially away from a surface of said rotor that orbits an axis of rotation of said rotor; and
   a housing at least partially surrounding said rotor and having a wall portion with rasp bars extending toward said rotor, said wall portion being substantially solid to prevent any significant amount of grain from passing through said wall portion, said rotor and said housing configured for tailings to be re-threshed between said threshing elements and said rasp bars within said housing;
   at least a portion of the rasp bars of the wall portion are located above the horizontal plane intersecting the axis of rotation;
   a re-threshing flow path between the housing and the rotor and between an inlet and an outlet, the flow path between the inlet and outlet extends less than 360 degrees about the axis of the rotor.

2. The improvement according to claim 1, wherein said threshing elements comprise flat bars, each having at least one serrated edge; and said serrated edge facing said rasp bars when each said threshing element is mounted to said rotor.

3. The improvement according to claim 1, wherein said threshing elements comprise angled bars with a first portion and a second portion forming an angle of greater than 89 degrees and less than 180 degrees.

4. The improvement according to claim 1, wherein said threshing elements comprise angled bars with a first portion connected to said rotor and a second portion connected to a rasp element.

5. The improvement according to claim 4, wherein said rasp element comprises a finned area formed by a plurality of elements extending upward from a base portion, and said base portion connected to said second portion of said threshing element and said finned area facing away from said rotor.

6. The improvement according to claim 1, wherein said rotor has a horizontal axis and an inlet arranged above said axis.

7. The improvement according to claim 1, wherein a portion of said wall portion is an adjustable wall portion that is adjustable between a plurality of positions along a direction toward and away from said rotor to adjust the clearance between said rasp bars and said threshing elements; and
   wherein the improvement comprises a fixing mechanism configured to fix the adjustable wall portion in at least two of the plurality of positions relative to the threshing elements.

8. The improvement according to claim 1, wherein said rotor has a horizontal axis and an inlet arranged above said axis and an outlet below said axis.

9. The improvement according to claim 1, wherein said wall portion is arranged so that the rasp bars mounted thereon are impacted directly by tailings flung through said inlet in a tangential direction.

10. The improvement according to claim 1, wherein said rotor has a horizontal axis and an inlet arranged above said axis and an outlet below said axis and wherein said wall portion is arranged so that the rasp bars mounted thereon are impacted directly by tailings flung through said inlet in a tangential direction.

11. The re-threshing mechanism according to claim 1, wherein each said rasp bar comprises a finned area formed by a plurality of elements extending upward from a base portion.

12. A re-threshing mechanism for a combine comprising:
   a rotor having threshing elements mounted thereon;
   said elements extend at least partially away from a surface of said rotor that orbits an axis of rotation of said rotor;
   a housing at least partially surrounding said rotor and having a wall portion with rasp bars extending toward said rotor, said wall portion being substantially solid, said rotor and said housing configured for tailings to be re-threshed between said threshing elements and said rasp bars within said housing;
   at least a portion of the rasp bars of the wall portion are located above the horizontal plane intersecting the axis of rotation; and
   a re-threshing flow path between the housing and the rotor and between an inlet and an outlet, the flow path between the inlet and outlet extends less than 360 degrees about the axis of the rotor.

13. The re-threshing mechanism according to claim 12, wherein each said rasp bar comprises a finned area formed by a plurality of elements extending upward from a base portion.

14. The re-threshing mechanism according to claim 12, wherein each said threshing element comprises flat bars, each having at least one serrated edge; said serrated edge facing said rasp bars when each said threshing element is mounted to said rotor.

15. The re-threshing mechanism according to claim 12, wherein said threshing elements comprise angled bars with a first portion and a second portion forming an angle of greater than 90 degrees and less than 180 degrees.

16. The re-threshing mechanism according to claim 12, wherein said threshing elements comprise angled bars with a first portion connected to said rotor and a second portion connected to a rasp element.

17. The re-threshing mechanism according to claim 16, wherein said rasp element comprises a finned area formed by a plurality of elements extending upward from a base portion, and said base portion connected to said second portion of said threshing element and said finned area facing away from said rotor.

18. The re-threshing mechanism according to claim 12, wherein said rotor has a horizontal axis and an inlet arranged above said axis.

19. The re-threshing mechanism according to claim 12, wherein said rotor has a horizontal axis and an inlet arranged above said axis and an outlet below said axis, wherein the outlet is open during at least a portion of the time when the re-threshing mechanism is operating to re-thresh crop material.

20. The re-threshing mechanism according to claim 12, wherein said wall portion is arranged so that the rasp bars mounted thereon are impacted directly by tailings flung through said inlet in a tangential direction.

21. The re-threshing mechanism according to claim 12, wherein said rotor has a horizontal axis and an inlet arranged above said axis and an outlet below said axis and wherein said wall portion is arranged so that the rasp bars mounted thereon are impacted directly by tailings flung through said inlet in a tangential direction.

22. The re-threshing mechanism according to claim 12, wherein said substantially solid wall portion is substantially solid such that prevents grain is prevented from passing through said wall portion.

23. A combine comprising:
a harvesting platform for harvesting and feeding crop materials into the combine;
a threshing section and a cleaning section for threshing and cleaning crop materials,
a re-threshing mechanism having a rotor, threshing elements mounted on said rotor, said elements extending at least partially away from a surface of said rotor that orbits an axis of rotation of said rotor, and
a housing at least partially surrounding said rotor and having a wall portion with rasp bars extending toward said rotor, said wall portion being substantially solid to prevent any significant amount of grain from passing through said wall portion, said rotor and said housing configured for tailings to be re-threshed between said threshing elements and said rasp bars within said housing,
at least a portion of the rasp bars of the wall portion are located above the axis of rotation;
a re-threshing flow path between the housing and the rotor and between an inlet and an outlet, the flow path between the inlet and outlet extends less than 360 degrees about the axis of the rotor.

24. The combine according to claim 23, wherein said wall portion is arranged so that the rasp bars mounted thereon are impacted directly by tailings flung through said inlet in a tangential direction.

25. A method of re-threshing tailings in a combine harvester comprising the steps of:
providing a housing having a stationary substantially solid wall portion having rasp bars extending therefrom;
providing an inlet into said housing and an outlet out of said housing;
providing a rotor within said housing having threshing elements extending away from a surface of said rotor that orbits an axis of rotation of said rotor;
throwing tailings through said inlet into said housing;
directing tailings in a re-threshing flow path between the housing and the rotor and between the inlet and an outlet, the flow path between the inlet and outlet extends less than 360 degrees about the axis of the rotor; and
re-threshing tailings along at least a portion of the re-threshing flow path between the threshing elements and said rasp bars above horizontal plane intersecting the axis of rotation of the rotor by rotating said rotor within said housing to separate grain from chaff.

26. The method according to claim 25, wherein the step of throwing is further defined by the steps of:
arranging the inlet to face said wall portion; and
throwing tailings tangentially into said housing to impact said rasp bars attached to said wall portion.

27. The method according to claim 25, comprising the step of directing the re-threshed grain and chaff out of the outlet by allowing gravity to move both the grain and chaff out of the outlet.

28. The method according to claim 25, wherein the step of throwing is further defined by the steps of:
arranging the inlet to face said wall portion; and
throwing tailings into said housing above the above the horizontal plane intersecting the axis of rotation of the rotor to impact said rasp bars attached to said wall portion.

* * * * *